(12) United States Patent
Cress et al.

(10) Patent No.: US 11,035,334 B1
(45) Date of Patent: Jun. 15, 2021

(54) ENGINE IGNITION SYSTEM AND METHOD USING SPARKPLUG DRY FIRING TO EXTEND SERVICE LIFE

(71) Applicant: Caterpillar Inc., Peoria, IL (US)

(72) Inventors: James Jay Cress, West Lafayette, IN (US); Chris Hoops, Bellingham, WA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/900,422

(22) Filed: Jun. 12, 2020

(51) Int. Cl.
| | |
|---|---|
| *F02P 15/08* | (2006.01) |
| *F02P 15/12* | (2006.01) |
| *F02B 19/12* | (2006.01) |
| *F02P 17/00* | (2006.01) |
| *F02P 9/00* | (2006.01) |
| *F02B 19/18* | (2006.01) |
| *F02P 5/15* | (2006.01) |

(52) U.S. Cl.
CPC ............ *F02P 17/00* (2013.01); *F02B 19/12* (2013.01); *F02B 19/18* (2013.01); *F02P 5/15* (2013.01); *F02P 9/002* (2013.01); *F02P 9/007* (2013.01); *F02P 15/08* (2013.01); *F02P 15/12* (2013.01)

(58) Field of Classification Search
CPC .. F02B 19/12; F02P 9/002; F02P 9/007; F02P 15/08; F02P 15/12
USPC ................... 123/260, 620, 630, 637; 73/114.02–114.11, 114.62, 114.67
See application file for complete search history.

(56) References Cited

U.S. PATENT DOCUMENTS

| | | | |
|---|---|---|---|
| 3,921,605 A | | 11/1975 | Wyczalek |
| 5,503,132 A | * | 4/1996 | Miyata .................... F02P 15/08 123/630 |
| 8,074,620 B2 | | 12/2011 | Filipek et al. |
| 8,104,444 B2 | | 1/2012 | Schultz |
| 9,926,904 B2 | * | 3/2018 | Kolhouse ............... F02M 26/16 |
| 2007/0236122 A1 | | 10/2007 | Borror |
| 2010/0206267 A1 | * | 8/2010 | Glugla .................. F02D 35/021 123/406.26 |

FOREIGN PATENT DOCUMENTS

| | | |
|---|---|---|
| DE | 102014214174 B4 | 1/2016 |
| DE | 102017011209 B3 | 1/2019 |
| JP | 5939022 B2 | 11/2013 |

* cited by examiner

*Primary Examiner* — Erick R Solis
(74) *Attorney, Agent, or Firm* — Brannon Sowers & Cracraft

(57) ABSTRACT

An ignition system for an engine includes a sparkplug, ignition circuitry electrically connected to the sparkplug, and an ignition control unit structured to energize the ignition circuitry to fire the sparkplug at an ignition timing, detect a fault condition caused by an abnormal response of the sparkplug to the energizing, and to energize the ignition circuitry to dry fire the sparkplug at an offset timing such as during an exhaust, stroke based on the detection of the fault condition. Dry firing the sparkplug reduces a break down voltage required to subsequently fire the sparkplug and extends sparkplug service life.

20 Claims, 4 Drawing Sheets

ENGINE IGNITION SYSTEM AND METHOD USING SPARKPLUG DRY FIRING TO EXTEND SERVICE LIFE

TECHNICAL FIELD

The present disclosure relates generally to a spark ignition system for an engine, and more particularly to dry firing a sparkplug in an ignition system to reduce a break down voltage required to subsequently fire the sparkplug.

BACKGROUND

Internal combustion engines, including gasoline or natural gas spark-ignited engines, diesel compression ignition engines, dual fuel engines, and still others, generally operate by producing a controlled combustion reaction within a cylinder to drive a piston coupled with a rotatable crankshaft. Concerns relating to emissions, price, supply availability, and still others have led in recent years to increased interest in the use of gaseous fuels such as natural gas. Natural gas, as well as other gaseous fuels and blends such as ethane, methane, landfill gas, biogas, mine gas, and others, can be combusted to produce relatively low levels of certain emissions and are often readily available even at remote locations.

Advantages of gaseous fuel engines with respect to emissions tend to be most significant where the fuel is combusted at a stoichiometrically lean ratio of fuel to air, having an equivalence ratio less than 1. Conventional spark-ignition strategies can sometimes fail to reliably ignite lean mixtures, potentially leading to misfire or combustion stability problems. Employing a prechamber sparkplug can address some of these concerns by enabling ignition of a small, relatively confined charge of a lean fuel and air mixture in a prechamber using a spark, producing a jet or multiple jets of hot combustion gases that are conveyed to a main combustion chamber, ultimately resulting in a hotter, more uniform, and typically more robust combustion reaction as compared to other techniques such as traditional sparkplugs.

Over the course of many hours of operation sparkplugs can fire at least millions of times. Sparkplug firing tends to have the effect of displacing material of the electrodes that form a spark gap across which a spark arcs. This loss of material can result in an increased voltage over time required to fire the sparkplug as the spark gap gradually enlarges. Internal combustion engine ignition systems typically address the need for increased voltage, known as "break down voltage," by providing whatever energizing voltage is required, up to some threshold that is typically determined by the capabilities of the ignition system. When it is no longer possible or practicable to fire the sparkplug, the engine cylinder must be shut down or the engine taken out of service entirely until the sparkplug can be replaced or serviced. One example prechamber type sparkplug is set forth in United States Patent Application Publication No. 2007/0236122 A1 to Borror.

SUMMARY OF THE INVENTION

In one aspect, an ignition system for an engine includes a sparkplug, and ignition circuitry electrically connected to the sparkplug. An ignition control unit is coupled with the ignition circuitry and structured to energize the ignition circuitry at an ignition timing. The ignition control unit is further structured to detect a fault condition of a cylinder in the engine caused by an abnormal response of the sparkplug to the energizing of the ignition circuitry at the ignition timing. The ignition control unit is further structured to energize the ignition circuitry to dry fire the sparkplug at an offset timing based on the detection of the fault condition, and reduce a break down voltage required to fire the sparkplug based on the energizing of the ignition circuitry to dry fire the sparkplug at the offset timing.

In another aspect, a method of extending a service life of a prechamber ignition device in an engine includes firing a sparkplug in the prechamber ignition device at an ignition timing to spark-ignite an ignition charge of a fuel and air in the prechamber ignition device. The method further includes conveying combustion gases of the spark-ignited ignition charge into a cylinder in the engine to ignite a main charge of the fuel and air in the cylinder. The method further includes dry firing the sparkplug at an offset timing, and limiting a break down voltage required to subsequently fire the sparkplug at the ignition timing based on the dry firing of the sparkplug at an offset timing.

In still another aspect, an ignition system for an engine includes an ignition control unit structured to command energizing ignition circuitry electrically connected to a sparkplug in the engine. The ignition control unit is further structured to command energizing the ignition circuitry to fire the sparkplug at an ignition timing, and detect a fault condition of the cylinder caused by an abnormal response of the sparkplug to energizing of the ignition circuitry at the ignition timing. The ignition control unit is further structured to command energizing the ignition circuitry to dry fire the sparkplug at an offset timing based on the detection of the fault condition, and reduce a break down voltage required to fire the sparkplug based on the energizing of the ignition circuitry at an offset timing.

DETAILED DESCRIPTION

Figure 1:
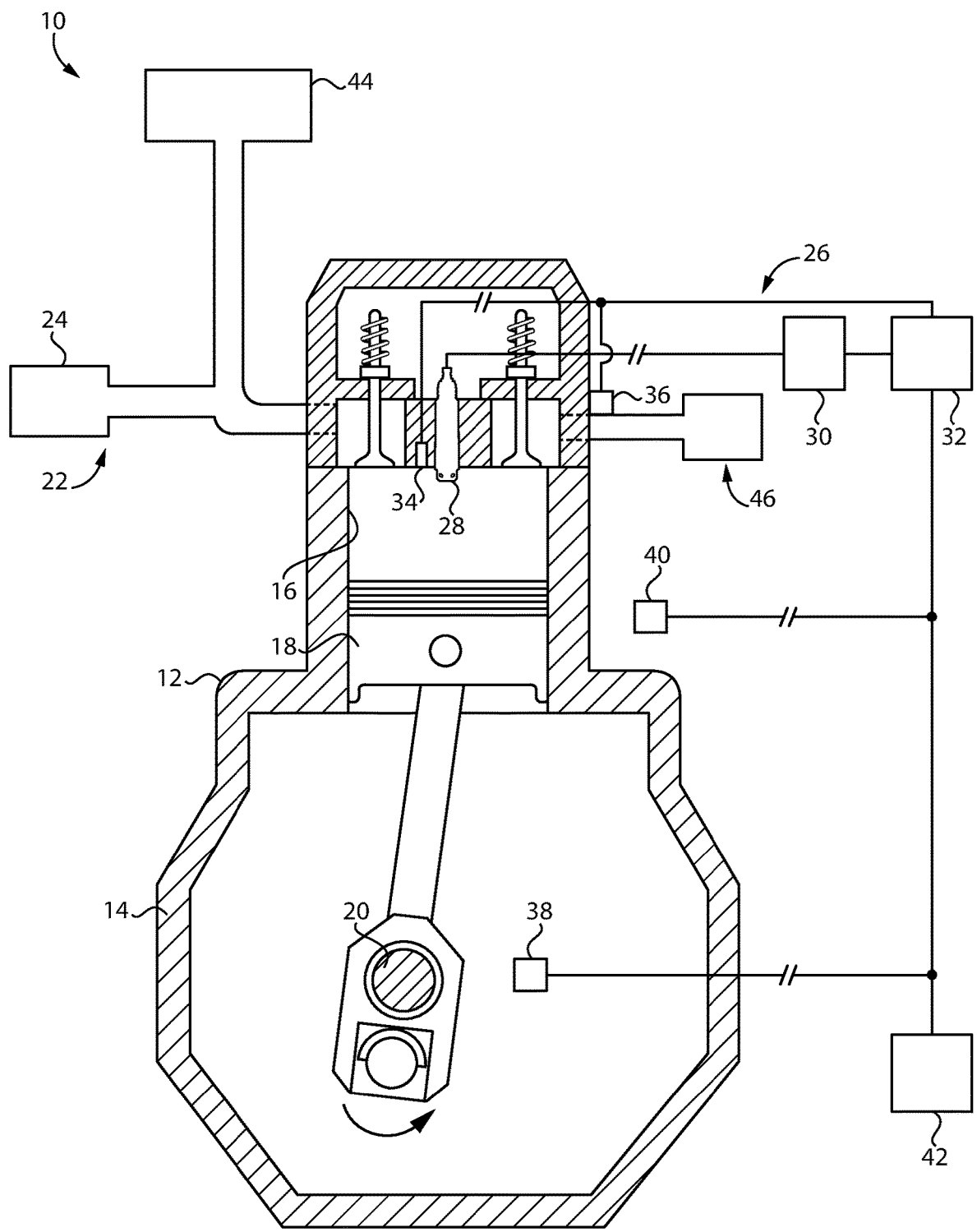
FIG. 1 is a diagrammatic view of an internal combustion engine system, according to one embodiment.

Referring to FIG. 1, there is shown an internal combustion engine system 10 according to one embodiment. Internal combustion engine system 10 (herein after "engine system 10") includes an engine 12 having an engine housing 14 with a cylinder 16 formed therein. A piston 18 is movable within cylinder 16 between a top dead center position and a bottom dead center position in a generally conventional manner. Engine system 10 also includes a crankshaft 20 coupled with piston 18 and rotatable in response to the moving of piston 18 also in a generally conventional manner. Cylinder 16 may be one of any number of cylinders in any suitable arrangement, such as a V-pattern, an inline pattern, or still another. Engine system 10 is spark-ignited and will typically be structured to operate in a four-stroke pattern upon a mixture of air and a gaseous fuel such as natural gas, methane, ethane, mine gas, landfill gas, biogas, blends of these, or still others. Engine system 10 could also operate upon a mixture of air and premixed gasoline, a mixture of a gaseous fuel and a directly injected liquid fuel, or other combinations and configurations.

Engine system 10 includes an air inlet 24 structured to receive and supply a flow of air to cylinder 16. Engine system 10 also includes a fuel supply 44, which may include a gaseous fuel supply storing a gaseous fuel in a cryogenically stored liquified state, or a compressed gaseous state, for example. Fuel supply 44 is structured to provide a flow of fuel to an incoming flow of air from air inlet 24 in intake system 22. Additional equipment in the nature of a compressor, filters, fuel admission valves, vaporization and pressurization equipment for cryogenically stored gaseous fuel, and potentially still other apparatus may be provided in engine system 10 for supplying and conditioning air and fuel for combustion. Gaseous fuel may be injected into an intake manifold or an intake runner of intake system 22 upstream of cylinder 16. In another implementation, engine system 10 operates as a fumigated engine system where gaseous fuel is delivered upstream of a compressor in a turbocharger, for example. In still other instances directly injected gaseous fuel could be used. Engine system 10 also includes an exhaust system 46 structured to receive and treat exhaust produced by the combustion of fuel and air in cylinder 16. Suitable intake and exhaust valves, exhaust aftertreatment, and still other equipment well known and not further described may be part of engine system 10.

Engine system 10 further includes an ignition system 26. Ignition system 26 includes a prechamber ignition device that may be a prechamber sparkplug 28, and ignition circuitry 30 electrically connected to sparkplug 28. Ignition system 26 also includes an ignition control unit 32 coupled with ignition circuitry 30 and structured to energize ignition circuitry 30 in a manner further discussed herein. Ignition circuitry 30 can include a primary ignition coil and a secondary ignition coil, with the primary ignition coil and the secondary ignition coil inductively coupled such that ignition control unit 32 can energize the primary ignition coil to responsively energize the secondary ignition coil and produce a voltage potential at electrodes of sparkplug 28 to form a spark. Ignition circuitry 30 can include any suitable configuration and arrangement of electrical components. Ignition control unit 32 will typically be capable of energizing ignition circuitry 30 up to a peak threshold voltage, with the peak threshold voltage typically being based upon design and hardware properties of ignition control unit 32. As will be further apparent from the following description, ignition control unit 32 may be structured to extend a service life of sparkplug 28 beyond a service life that would otherwise be expected, by reducing a break down voltage required for sparkplug firing.

Ignition system 26 further includes a combustion sensor structured to produce data indicative of a fault condition of cylinder 16 caused by an abnormal response of sparkplug 28 to energizing ignition circuitry 30 at an ignition timing. The combustion sensor can include at least one of a pressure sensor 34 that is structured to sense a pressure in cylinder 16, an exhaust port sensor 36 structured to monitor a temperature of exhaust from cylinder 16, or a load stability sensor 40. Alone or in combination, pressure sensor 34, exhaust port sensor 36, and load stability sensor 40 can be used to produce data indicating the occurrence or non-occurrence, or other properties, of a combustion event in cylinder 16 enabling ignition control unit 32 to detect a fault condition of cylinder 16 caused by an abnormal response of sparkplug 28 as noted above. Sensing cylinder pressure indicative of heat release from a combustion event is a well-known technique, likewise monitoring exhaust port temperature to detect combustion is a known technique. Load stability can include fluctuations or excursions in engine load that can be indicative of the occurrence or non-occurrence, or other properties, of combustion events in one or more cylinders of engine system 10. Since engine load cannot be sensed directly, load stability sensor 40 may include a sensor structured to monitor one or more parameters indicative of load, such as intake air mass flow, temperatures, fueling rate, or other factors having a known or determinable relationship with engine load. Ignition system 26 further includes an engine speed sensor 38 structured to produce an engine timing signal. Engine speed sensor 38 may be coupled to crankshaft 20, to a flywheel, or another component enabling ignition control unit 32 to determine present crank angle timing in an engine cycle. Ignition system 26 may still further include an operator alert 42, which could include a check engine light, for example, that can be activated or otherwise operated for purposes of notifying an operator of a fault condition, initiation of a service life extending operating mode, or for other purposes.

Figure 2:
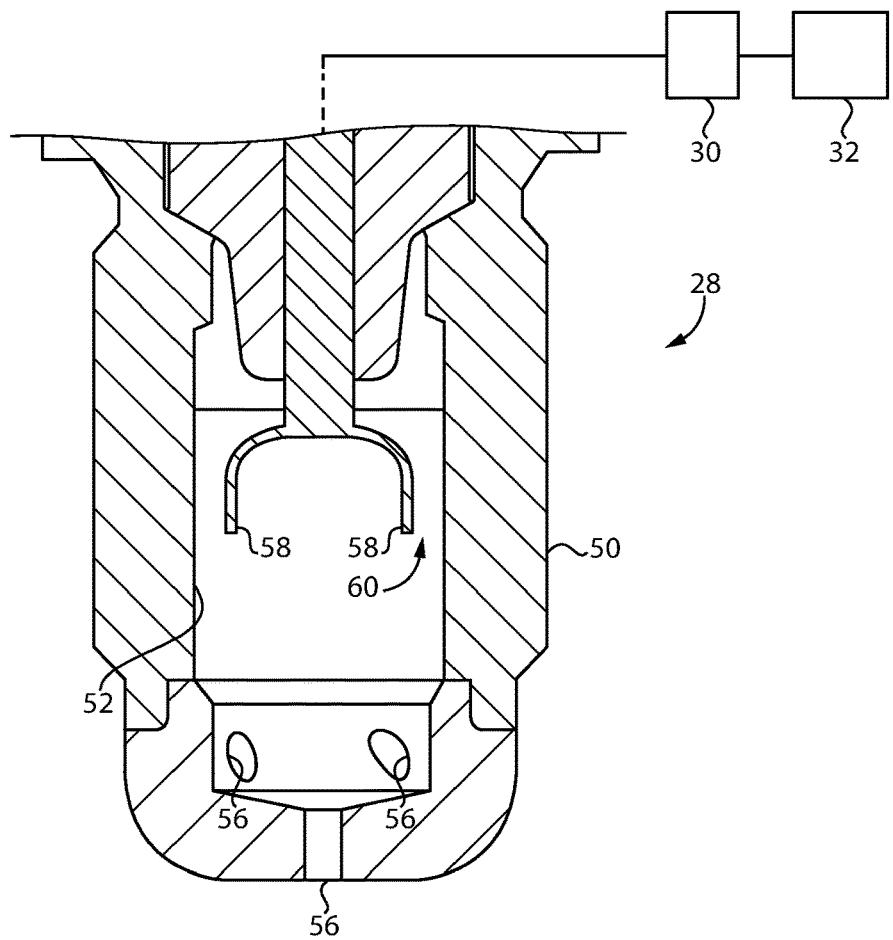
FIG. 2 is a sectioned view through a portion of a prechamber ignition device in an engine ignition system, according to one embodiment.

Referring also now to FIG. 2, there are shown additional features of prechamber sparkplug 28. Prechamber sparkplug 28 includes a housing 50 forming a prechamber 52 and ignition gas outlets 54 and 56 from prechamber 52. Ignition gas outlets 54 and 56 can receive fuel and air conveyed from cylinder 16 in response to movement of piston 18, to form an ignition charge in prechamber 52, as well as conveying combustion gases of the ignition charge out of prechamber 52 and into cylinder 16 to ignite a main charge. Sparkplug 28 further includes electrodes 58 within prechamber 52 and forming a spark gap 60, or a plurality of spark gaps, within prehcamber 52. In the illustrated embodiment housing 50 serves as an electrode in each of a plurality of electrode pairs. Housing 50 may form a ground electrode. As discussed above over the course of a sparkplug service life a voltage required to fire sparkplug 28 can increase, ultimately reaching a threshold of break down voltage that ignition system 26 is no longer able to practicably provide. The present disclosure contemplates extending a service life of a prechamber ignition device such as sparkplug 28 by limiting the break down voltage required to fire sparkplug 28, as further discussed herein.

Figure 3:
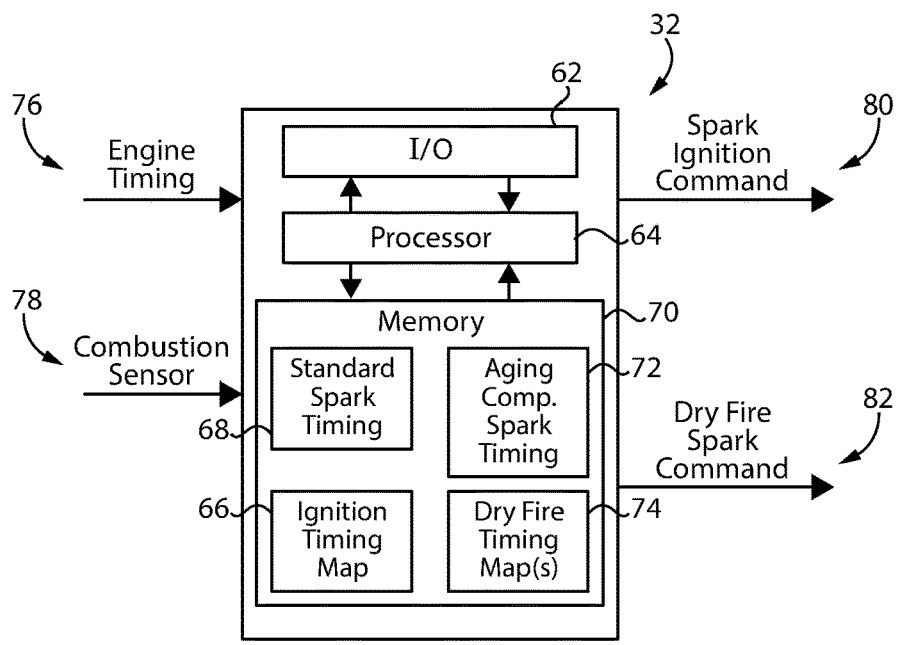
FIG. 3 is a functional block diagram of an ignition control unit, according to one embodiment.

Referring also now to FIG. 3, there are shown additional features of ignition control unit 32. Ignition control unit 32 includes an I/O or input/output interface 62, a processor 64, and a memory 66. Processor 64 can include any suitable central processing unit such as a microprocessor, a microcontroller, or a field programmable gate array (FPGA). Memory 66 may include any suitable computer readable memory and stores data, tables or maps, and control routines that can be executed by processor 64. Memory 66 could be RAM, ROM, SDRAM, EEPROM, flash, a hard drive, or still another type of computer readable memory. Memory 66 stores a standard spark timing control routine 68 and a standard ignition timing map 70 in the illustrated embodiment. Memory 66 also stores an aging compensation spark timing routine 72 and one or more dry fire timing maps 74 in the illustrated embodiment. An engine timing signal is shown inputted to ignition control unit 32 at 76. A combustion sensor input is shown at 78, including inputs from one or more of sensors 34, 36, 40, or still others. A spark ignition command produced by ignition control unit 32 is shown at 80, and a dry fire spark command produced by ignition control unit 32 is shown at 82.

Ignition control unit 32 may be structured, such as by way of execution of standard spark timing routine 68, to energize ignition circuitry 30 to fire sparkplug 28 at an ignition timing as determined by referencing ignition timing map 70. In one implementation, the ignition timing will be a crank angle of approximately zero degrees, such that ignition circuitry 30 is energized to fire sparkplug 28 when piston 18 is at or near a top dead center position in cylinder 16. Ignition control unit 32 may be further structured to detect a fault condition of cylinder 16, or other cylinders in engine 12, caused by an abnormal response of sparkplug 28 or other respective sparkplugs to energizing of ignition circuitry 30 at the ignition timing. An abnormal response of sparkplug 28 could include a failure of sparkplug 28 to fire, hence the fault condition may include a cylinder misfire condition caused by a failure of sparkplug 28 to fire. The abnormal response of sparkplug 28 could also include a number of times in a sampling period that sparkplug 28 fails to fire, sputtering, or some other abnormal response different from what is desired for successfully igniting an ignition charge in prechamber 52 that can then ignite a main charge in cylinder 16.

Ignition control unit 32 may be further structured to energize ignition circuitry 30 to dry fire sparkplug 28 at an offset timing based on the detection of the fault condition, and reduce a break down voltage required to subsequently fire sparkplug 28 based on the energizing of ignition circuitry 30 to dry fire sparkplug 28 at the offset timing. Dry firing sparkplug 28 means producing a spark at spark gap 60, for example, when no combustible fuel, or only an amount of fuel insufficient to ignite, is present in prechamber 52. Dry firing of sparkplug 28 therefore does not include firing or attempting to fire sparkplug 28 when fuel sufficient to ignite is present in prechamber 52. Dry firing sparkplug 28 can include dry firing sparkplug 28 during an exhaust stroke of piston 18 in cylinder 16, or potentially during an intake stroke, when substantially only burned combustion products are present in prechamber 52. The offset timing is thus understood as a timing that is offset from a normal ignition timing, and a timing where firing of sparkplug 28 will typically not result in ignition of fuel.

The present disclosure reflects the discovery that dry firing sparkplug 28 makes it easier, subsequently, to live fire sparkplug 28. It is believed that the additional firing at an offset timing produces gas ionization inside prechamber 52, and due to a shielding effect of prechamber 52 most or all of the ionized gas is retained inside the prechamber up until such point in time that sparkplug 28 is again commanded to live fire. In other words, one or more dry fires of sparkplug 28 can result in ionized gas retained inside prechamber 52 through a remaining exhaust, intake, and compression cycle allowing spark gap 60 to break down at a reduced break down voltage than what would otherwise be required. As further discussed herein, the reduction to break down voltage can eliminate misfire and allow engine system 10 to continue operating, while optionally providing an operator a warning or alert that ignition system 26 is in need of servicing without disrupting engine operation.

In a further implementation, ignition control unit 32 is structured to energize ignition circuitry 30 to fire sparkplug 28 a plurality of times at offset timings in an engine cycle based on the detection of the fault condition. As noted above, ignition control unit 32 may receive engine timing signal 76, and energize ignition circuitry 30 to fire sparkplug 28 a plurality of times at offset timings during an exhaust stroke of piston 18 in engine 12 based on the engine timing signal.

Operation in this manner can be understood as electronic control unit 32 observing sputtering, or other abnormal operation associated with cylinder 16, as a peak threshold voltage that ignition circuitry 30 can attain is reached or approached, and taking action to compensate by reducing the break down voltage required to subsequently fire sparkplug 28.

In some implementations, ignition control unit 32 may dry fire sparkplug 28 in a manner that is based on an aging state of sparkplug 28. Ignition control unit 32 may be further structured to trigger an early aging compensation mode based on the detection of the fault condition, and dry fire sparkplug 28 in one or more following engine cycles after the detection of the fault condition. Ignition control until 32 may be further structured to detect a subsequent fault condition, and trigger a late aging compensation mode based on the detection of the subsequent fault condition. This capability could be understood as ignition control unit 32 compensating for sparkplug aging in a first way when sparkplug 28 is at an earlier aging state, and compensating in a different way when sparkplug 28 is at a later aging state. Ignition control unit 32 may be further structured to energize ignition circuitry 30 an increased number of times at offset timings in an engine cycle in the late aging compensation mode relative to the early aging compensation mode. Put differently, ignition control unit 32 dry fires sparkplug 28 more times per engine cycle when sparkplug 28 has aged further than when service life extension is first initiated. As depicted in FIG. 3, memory 66 includes one or more dry fire timing maps 74. Electronic control unit 32 could dry fire sparkplug 28 a number of times, at offset timings, that is determined by looking up firing parameters in maps 74.

Figure 4:
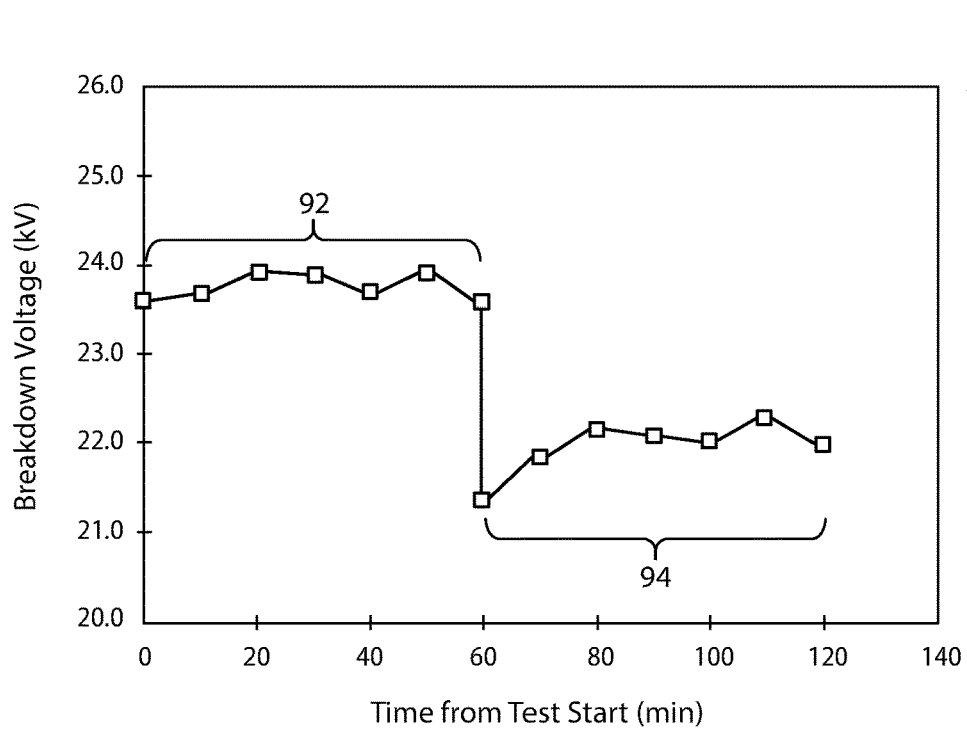
FIG. 4 is a graph of break down voltage in relation to time where different sparkplug operating strategies are used.

Referring also now to FIG. 4, there is shown a graph 90 illustrating break down voltage on the Y-axis and time from test start on the X-axis. During a time period 92, break down voltage is relatively higher, and during another time period 94 break down voltage is relatively lower. In the case of time period 92, no exhaust stroke dry firings or other dry firings of sparkplug 28 at offset timings are performed. During time period 94, three exhaust stroke dry firings per engine cycle are performed. FIG. 4 represents actual test data, from which it can be readily understood that the exhaust stroke dry firing reduces the break down voltage required to fire sparkplug 28.

Figure 5:
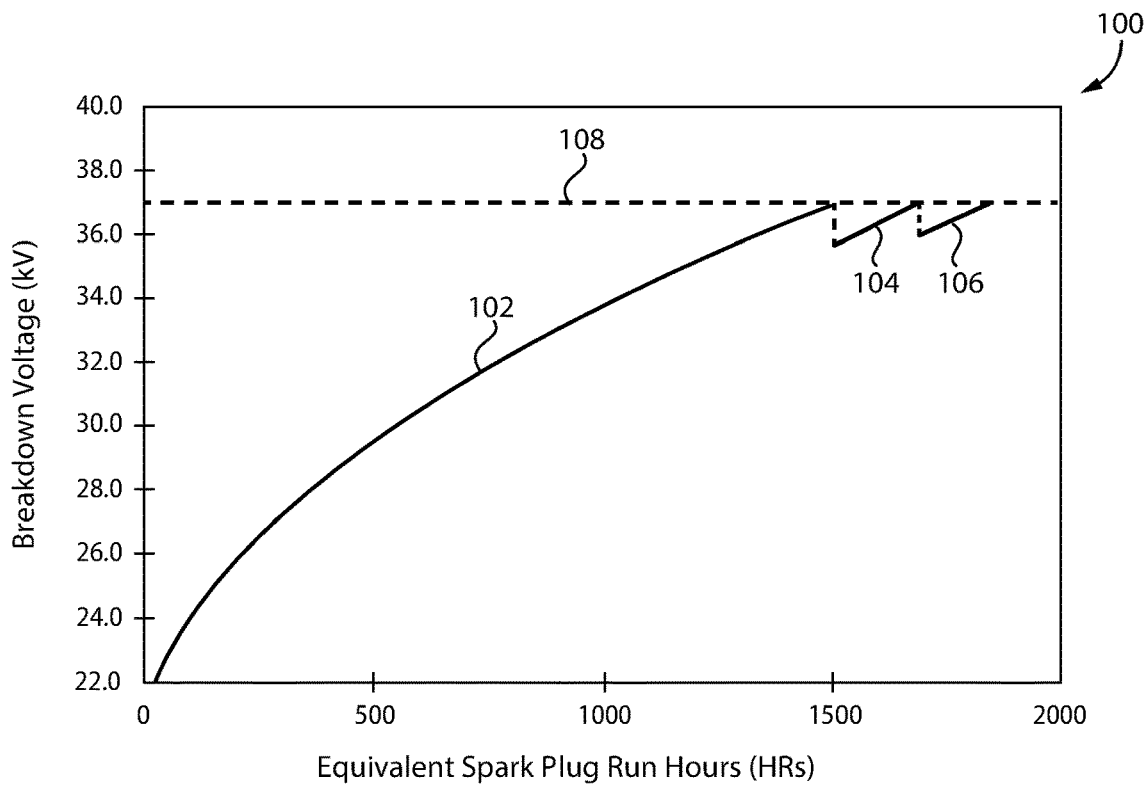
FIG. 5 is a graph of break down voltage in relation to time for a sparkplug operating service life, according to one embodiment.

Referring also now to FIG. 5, there is shown another graph 100, where break down voltage is shown on the Y-axis and sparkplug run hours are shown on the X-axis. Line 102 represents a trend in increasing break down voltage that might be observed up to a point at which an ignition system voltage capacity or threshold 108 is reached. Line 102 can thus be understood as a standard ignition strategy executed over a first part of a sparkplug service life, with break down voltage increasing and the ignition system increasing the voltage to which ignition circuitry for a sparkplug is energized over time. When line 102 reaches voltage capacity 108, the sparkplug may fail to fire, with the associated cylinder misfiring. At the point in time where line 102 intersects line 108, or at an earlier time if desired, ignition control unit 32 may trigger the early aging compensation mode, and commence dry firing sparkplug 28 to compensate for the aging of the sparkplug and reduce the break down voltage required to subsequently fire the sparkplug. Continued operation in the early aging compensation mode is shown by way of line 104. Break down voltage continues to increase as shown by line 104 over time until the break down voltage required to fire sparkplug 28 again reaches voltage capacity 108. At this point in time a subsequent fault condition, including a misfire condition caused by a failure of sparkplug 28 to fire, can be detected, and ignition control unit 32 triggers a late aging compensation mode based on the subsequent fault condition. Operation in the late aging compensation mode is shown by way of line 106. During the early aging compensation mode sparkplug 28 might have three dry fires during each exhaust stroke. During the late aging compensation mode sparkplug 28 may be dry fired ten times in each exhaust stroke, for example.

INDUSTRIAL APPLICABILITY

Figure 6:
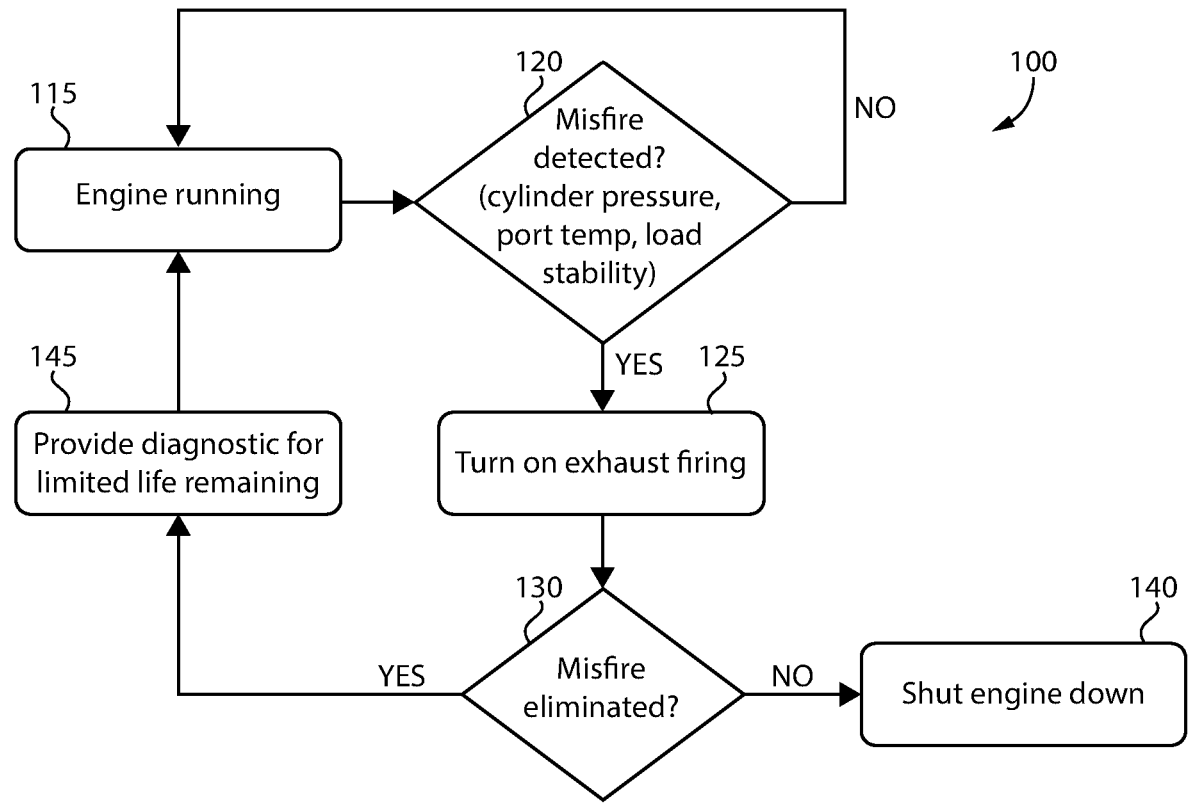
FIG. 6 is a flowchart illustrating example methodology and logic flow, according to one embodiment.

Referring to the drawings generally, and also now to FIG. 6, there is shown a flowchart 110 illustrating example methodology and logic flow, according to the present disclosure. At a block 115 the engine or engine system is operating, and flowchart 110 can advance to a block 120 to determine is misfire detected? If no, the logic can loop back to block 115. If yes, the logic can advance to a block 125 to turn on exhaust firing. Turning on exhaust firing at block 125 means that ignition control unit 32 commences energizing ignition circuitry 30 to dry fire sparkplug 28 as discussed herein. If the misfire detected is a first misfire or first fault condition over the course of a sparkplug 28 service life then an early aging compensation mode may be triggered at block 125. If the misfire detected is a subsequent fault then, for example, the late aging compensation mode could be triggered.

From block 125 the logic may advance to a block 130 to determine is misfire eliminated? If no, the logic can advance to a block 140 to shut the engine down. If yes, the logic can advance to a block 145 to provide a diagnostic for limited life remaining. At block 145, ignition control unit 32 may activate alert 42, log a fault or set a flag in memory, start a timer, communicate with a remote server, send a text message to an operator device, or provide still another diagnostic.

The foregoing description emphasizes detection of a fault condition such as a misfire condition caused by a failure of a sparkplug to fire. By detecting a misfire condition exhaust firing of a sparkplug can be initiated to reduce the break down voltage required to subsequently fire the sparkplug, or in some instances limits an increase in the break down voltage required. In other words, embodiments are contemplated where the required break down voltage can be held steady by implementing the techniques of the present disclosure rather than actually reducing the break down voltage to a lower level. Moreover, in some instances a sparkplug might be dry fired at offset timings prior to any fault ever occurring. In other words, based upon a time in service of a sparkplug, or based upon reaching a threshold break down voltage level, dry firing at offset timings could be initiated even before misfire occurs.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An ignition system for an engine comprising:
   a sparkplug;
   ignition circuitry electrically connected to the sparkplug;
   an ignition control unit coupled with the ignition circuitry, the ignition control unit being structured to:
      energize the ignition circuitry at an ignition timing;
      detect a fault condition of a cylinder in the engine caused by an abnormal response of the sparkplug to the energizing of the ignition circuitry at the ignition timing;
      energize the ignition circuitry to dry fire the sparkplug at an offset timing based on the detection of the fault condition; and
      reduce a break down voltage required to fire the sparkplug based on the energizing of the ignition circuitry to dry fire the sparkplug at the offset timing.

2. The ignition system of claim 1 wherein the fault condition includes a misfire condition caused by a failure of the sparkplug to fire.

3. The ignition system of claim 2 wherein the ignition control unit is further structured to energize the ignition circuitry to dry fire the sparkplug a plurality of times at offset timings in an engine cycle based on the detection of the fault condition.

4. The ignition system of claim 3 wherein the ignition control unit is further structured to:
   trigger an early aging compensation mode based on the fault condition;
   detect a subsequent fault condition; and
   trigger a late aging compensation mode based on the subsequent fault condition.

5. The ignition system of claim 4 wherein the ignition control unit is further structured to energize the ignition circuitry to dry fire the sparkplug an increased number of times in an engine cycle in the late aging compensation mode relative to the early aging compensation mode.

6. The ignition system of claim 1 wherein the sparkplug includes a prechamber sparkplug in a prechamber ignition device having a housing forming a prechamber and ignition gas outlets from the prechamber, and electrodes forming a spark gap within the prechamber.

7. The ignition system of claim 6 wherein the electrodes include a ground electrode formed by the housing.

8. The ignition system of claim 6 wherein the ignition control unit is further structured to:
   receive an engine timing signal; and
   energize the ignition circuitry to dry fire the sparkplug at the offset timing during an exhaust stroke of a piston in the engine based on the engine timing signal.

9. The ignition system of claim 1 further comprising a combustion sensor structured to produce data indicative of the fault condition and including at least one of a pressure sensor, an exhaust port sensor, or a load stability sensor.

10. A method of extending a service life of a prechamber ignition device in an engine comprising:
   firing a sparkplug in the prechamber ignition device at an ignition timing to spark-ignite an ignition charge of a fuel and air in the prechamber ignition device;
   conveying combustion gases of the spark-ignited ignition charge into a cylinder in the engine to ignite a main charge of the fuel and air in the cylinder;
   dry firing the sparkplug at an offset timing; and limiting a break down voltage required to subsequently fire the sparkplug at the ignition timing based on the dry firing of the sparkplug at an offset timing.

11. The method of claim 10 further comprising detecting a misfire condition caused by a failure of the sparkplug to fire, and wherein the dry firing of the sparkplug at the offset timing is based on the detection of the misfire condition.

12. The method of claim 10 wherein the dry firing of the sparkplug at the offset timing further includes dry firing the sparkplug a plurality of times in an engine cycle.

13. The method of claim 12 wherein the dry firing of the sparkplug at the offset timing further includes dry firing the sparkplug a number of times that is based on an aging state of the sparkplug.

14. The method of claim 10 wherein the dry firing of the sparkplug at an offset timing includes dry firing the sparkplug during an exhaust stroke of a piston in the cylinder.

15. The method of claim 10 wherein the limiting of the break down voltage includes reducing the break down voltage from a peak threshold voltage based on the dry firing of the sparkplug at the offset timing.

16. The method of claim 10 wherein the firing of the sparkplug at the ignition timing further includes firing the sparkplug to spark-ignite an ignition charge of a gaseous fuel and air conveyed from the cylinder into the prechamber ignition device.

17. An ignition system for an engine comprising:
an ignition control unit structured to command energizing ignition circuitry electrically connected to a sparkplug in the engine;
the ignition control unit being further structured to:
command energizing the ignition circuitry to fire the sparkplug at an ignition timing;
detect a fault condition of the cylinder caused by an abnormal response of the sparkplug to energizing of the ignition circuitry at the ignition timing;
command energizing the ignition circuitry to dry fire the sparkplug at an offset timing based on the detection of the fault condition; and
reduce a break down voltage required to fire the sparkplug based on the energizing of the ignition circuitry at an offset timing.

18. The ignition system of claim 17 wherein the ignition control unit is further structured to command the energizing of the ignition circuitry to dry fire the sparkplug a number of times, at offset timings, that is based on an aging state of the sparkplug.

19. The ignition system of claim 17 further comprising an engine timing sensor structured to produce an engine timing signal, and wherein the ignition control unit is further structured to command the energizing of the ignition circuitry to dry fire the sparkplug at an offset timing during an exhaust stroke of a piston in the engine, based on the engine timing signal.

20. The ignition system of claim 17 further comprising a combustion sensor, and the ignition control unit is further structured to detect the combustion fault condition based on data produced by the combustion sensor indicative of a failure to fire condition of the sparkplug.

\* \* \* \* \*